US012283267B2

(12) United States Patent
Ahn et al.

(10) Patent No.: US 12,283,267 B2
(45) Date of Patent: Apr. 22, 2025

(54) SPEECH SYNTHESIS APPARATUS AND METHOD THEREOF

(71) Applicant: Hyperconnect LLC, Seoul (KR)

(72) Inventors: Sang Il Ahn, Cheongju-si (KR); Seung Woo Choi, Seoul (KR); Seung Ju Han, Seoul (KR); Dong Young Kim, Seoul (KR); Sung Joo Ha, Gyeonggi-do (KR)

(73) Assignee: Hyperconnect LLC, Dallas, TX (US)

( * ) Notice: Subject to any disclaimer, the term of this patent is extended or adjusted under 35 U.S.C. 154(b) by 421 days.

(21) Appl. No.: 17/455,211

(22) Filed: Nov. 16, 2021

(65) Prior Publication Data

US 2022/0199068 A1 Jun. 23, 2022

(30) Foreign Application Priority Data

Dec. 18, 2020 (KR) .................. 10-2020-0178870

(51) Int. Cl.
*G10L 13/00* (2006.01)
*G10L 13/047* (2013.01)
*G10L 15/16* (2006.01)

(52) U.S. Cl.
CPC ............ *G10L 13/047* (2013.01); *G10L 15/16* (2013.01)

(58) Field of Classification Search
CPC ......... G10L 15/16; G10L 13/02; G10L 13/08; G10L 13/033; G10L 13/047; G10L 25/30; G10L 13/04; G10L 17/04; G10L 13/10; G10L 19/00; G10L 2013/021; G10L 15/26; G10L 25/18; G10L 13/00; G10L 15/02; G10L 15/14; G10L 17/02; G10L 17/14; G10L 17/18; G10L 19/04; G10L 2015/025; G10L 13/027; G10L 25/24; G10L 13/06; G10L 13/086; G10L 15/142; G10L 15/22;

(Continued)

(56) References Cited

U.S. PATENT DOCUMENTS 6,571,234 B1  5/2003  Knight et al.
6,731,307 B1  5/2004  Strubbe et al.
(Continued)

FOREIGN PATENT DOCUMENTS

CN    112541060 A    3/2021
JP    2003202885 A   7/2003
(Continued)

OTHER PUBLICATIONS

Cooper et al., "Zero-Shot Multi-Speaker Text-to-Speech with State-of-the-Art Neural Speaker Embeddings," arXiv:1910.10838v2, Feb. 4, 2020, 5 pgs.
(Continued)

*Primary Examiner* — Abdelali Serrou
(74) *Attorney, Agent, or Firm* — Patent Capital Group

(57) ABSTRACT

Disclosed is a speech synthesis method including acquiring second speech data and a target text, acquiring first information includes embedding information corresponding to the second speech data, acquiring second information including embedding information of the second speech data, the embedding information in relation with components generated based on a sequence of the target text, and acquiring audio data corresponding to the target text and reflecting characteristics of speech of a speaker based on the first information and the second information.

16 Claims, 10 Drawing Sheets

(58) Field of Classification Search
CPC . G10L 2015/225; G10L 25/63; G06F 40/289; G06F 40/30; G06F 40/284; G06F 16/3344; G06F 16/35; G06F 18/214; G06F 16/334; G06F 16/51; G06F 16/56; G06F 16/5838; G06F 16/5846; G06F 18/22; G06F 40/00; G06F 40/40; G06F 40/58; G06F 16/367; G06F 16/583; G06F 16/5866; G06F 40/126; G06F 16/3329; G06F 16/3346; G06F 16/355; G06F 16/635; G06F 16/683; G06F 16/9535; G06F 18/2415; G06F 18/24323; G06F 3/04842; G06F 40/211; G06F 40/216; G06F 40/253

See application file for complete search history.

(56) References Cited

U.S. PATENT DOCUMENTS

| | | | |
|---|---|---|---|
| 6,735,615 | B1 | 5/2004 | Iwayama et al. |
| 6,804,647 | B1 | 10/2004 | Heck et al. |
| 6,804,675 | B1 | 10/2004 | Knight et al. |
| 7,277,855 | B1 | 10/2007 | Acker et al. |
| 7,685,237 | B1 | 3/2010 | Weaver et al. |
| 10,176,819 | B2 | 1/2019 | Sun et al. |
| 10,872,596 | B2 * | 12/2020 | Ping ........................ G10L 13/08 |
| 10,930,263 | B1 | 2/2021 | Mahyar |
| 11,081,104 | B1 | 8/2021 | Su et al. |
| 11,418,461 | B1 | 8/2022 | Elfardy et al. |
| 11,615,777 | B2 | 3/2023 | Ahn et al. |
| 11,645,547 | B2 | 5/2023 | Tian et al. |
| 2002/0120450 | A1 | 8/2002 | Junqua et al. |
| 2004/0111271 | A1 | 6/2004 | Tischer |
| 2005/0144247 | A1 | 6/2005 | Christensen et al. |
| 2006/0149558 | A1 | 7/2006 | Kahn et al. |
| 2006/0210034 | A1 | 9/2006 | Beadle et al. |
| 2006/0235932 | A1 | 10/2006 | Celi, Jr. et al. |
| 2007/0005754 | A1 | 1/2007 | Horvitz et al. |
| 2007/0071206 | A1 | 3/2007 | Gainsboro et al. |
| 2008/0082333 | A1 | 4/2008 | Nurminen et al. |
| 2008/0147385 | A1 | 6/2008 | Nurminen et al. |
| 2008/0183473 | A1 | 7/2008 | Nagano et al. |
| 2008/0207242 | A1 | 8/2008 | Ekberg |
| 2008/0235024 | A1 | 9/2008 | Goldberg et al. |
| 2009/0037179 | A1 | 2/2009 | Liu et al. |
| 2009/0171657 | A1 | 7/2009 | Tian et al. |
| 2009/0177473 | A1 | 7/2009 | Aaron et al. |
| 2009/0204510 | A1 | 8/2009 | Hwang |
| 2010/0161327 | A1 | 6/2010 | Chandra et al. |
| 2012/0189272 | A1 | 7/2012 | Kunigita et al. |
| 2012/0226500 | A1 | 9/2012 | Balasubramanian et al. |
| 2013/0332167 | A1 | 12/2013 | Kilgore |
| 2014/0195227 | A1 | 7/2014 | Rudzicz et al. |
| 2014/0303958 | A1 | 10/2014 | Lee et al. |
| 2015/0379654 | A1 | 12/2015 | Deshmukh et al. |
| 2016/0005403 | A1 | 1/2016 | Agiomyrgiannakis et al. |
| 2016/0036962 | A1 | 2/2016 | Rand |
| 2016/0104474 | A1 | 4/2016 | Bunn et al. |
| 2016/0203827 | A1 | 7/2016 | Leff et al. |
| 2016/0379643 | A1 | 12/2016 | Ito et al. |
| 2017/0171509 | A1 | 6/2017 | Huang et al. |
| 2017/0171599 | A1 | 6/2017 | Peng |
| 2017/0249953 | A1 | 8/2017 | Yassa et al. |
| 2017/0301340 | A1 | 10/2017 | Yassa et al. |
| 2018/0048865 | A1 | 2/2018 | Taylor et al. |
| 2018/0063556 | A1 | 3/2018 | Kalmanson et al. |
| 2018/0090126 | A1 | 3/2018 | Peterson et al. |
| 2018/0130471 | A1 | 5/2018 | Trufinescu et al. |
| 2018/0204576 | A1 | 7/2018 | Dhoot et al. |
| 2018/0316964 | A1 | 11/2018 | Dillon et al. |
| 2019/0044985 | A1 | 2/2019 | Jo et al. |
| 2019/0079941 | A1 | 3/2019 | Sarkar et al. |
| 2019/0108242 | A1 * | 4/2019 | Liu ........................ G06F 18/22 |
| 2019/0155905 | A1 | 5/2019 | Bachrach et al. |
| 2019/0221225 | A1 | 7/2019 | Bricklin et al. |
| 2019/0251952 | A1 | 8/2019 | Arik et al. |
| 2019/0334842 | A1 | 10/2019 | Sato |
| 2019/0354594 | A1 | 11/2019 | Foster et al. |
| 2020/0013422 | A1 | 1/2020 | Matkin |
| 2020/0082807 | A1 | 3/2020 | Kim et al. |
| 2020/0197810 | A1 | 6/2020 | Kung et al. |
| 2020/0265829 | A1 | 8/2020 | Liu et al. |
| 2020/0279017 | A1 | 9/2020 | Norton et al. |
| 2020/0395008 | A1 | 12/2020 | Cohen et al. |
| 2021/0020161 | A1 * | 1/2021 | Gao ........................ G10L 13/08 |
| 2021/0043187 | A1 | 2/2021 | Ahn et al. |
| 2021/0217404 | A1 * | 7/2021 | Jia ........................ G10L 13/033 |
| 2022/0083744 | A1 | 3/2022 | Li et al. |
| 2022/0092651 | A1 | 3/2022 | Sureshkumar et al. |
| 2022/0238116 | A1 * | 7/2022 | Gao ........................ G10L 17/14 |
| 2022/0246136 | A1 * | 8/2022 | Yang ..................... G10L 13/033 |
| 2022/0269934 | A1 | 8/2022 | Song |
| 2022/0277141 | A1 | 9/2022 | Nijkamp et al. |
| 2022/0328038 | A1 | 10/2022 | Otani et al. |
| 2022/0382978 | A1 | 12/2022 | Wagner et al. |
| 2023/0077528 | A1 | 3/2023 | Erdenee et al. |
| 2023/0080930 | A1 | 3/2023 | Seo et al. |
| 2023/0154453 | A1 | 5/2023 | Erdenee et al. |
| 2023/0215418 | A1 | 7/2023 | Ahn et al. |
| 2023/0229864 | A1 | 7/2023 | Kim et al. |
| 2023/0229964 | A1 | 7/2023 | Kim et al. |
| 2024/0131439 | A1 | 4/2024 | Kim et al. |

FOREIGN PATENT DOCUMENTS

| | | |
|---|---|---|
| JP | 2019179257 A | 10/2019 |
| JP | 2020160319 A | 10/2020 |
| KR | 20000036463 A | 7/2000 |
| KR | 20010091677 A | 10/2001 |
| KR | 20090028151 A | 3/2009 |
| KR | 101632435 B1 | 6/2016 |
| KR | 20170107683 A | 9/2017 |
| KR | 20180059322 A | 6/2018 |
| KR | 20190008137 A | 1/2019 |
| KR | 20190085882 A | 7/2019 |
| KR | 10-2170563 B1 | 10/2020 |
| KR | 10-2173553 B1 | 11/2020 |
| WO | 2018074516 A1 | 4/2018 |
| WO | 2019139430 A1 | 7/2019 |
| WO | 2019222591 A1 | 11/2019 |

OTHER PUBLICATIONS

Hsu et al., "Hierarchical generative modeling for controllable speech synthesis," arXiv preprint arXiv:1810.07217v2, Dec. 27, 2018, 27 pgs.

Lee et al., "Robust and Fine-Grained Prosody Control of End-to-End Speech Synthesis," arXiv:1811.02122v2, Feb. 18, 2019, 5 pgs.

Choi et al., "Attentron: Few-Shot Text-to-Speech Utilizing Attention-Based Variable-Length Embedding," ArXiv abs/2005.08484, Aug. 12, 2020 (Version 2), 5 pages.

Choi et al., "Attentron: Few-Shot Text-to-Speech Utilizing Attention-Based Variable-Length Embedding," ArXiv abs/2005.08484, May 18, 2020 (Version 1), 5 pages.

Extended European Search Report for Application No. 20189677.6, Dated Sep. 28, 2020, 9 pgs.

Extended European Search Report for Application No. 22189981.8, mailed Jan. 17, 2023, 9 pgs.

Extended European Search Report for Application No. 22207004.7 dated Mar. 9, 2023, 9 pgs.

Japanese Office Action for Application No. 2020-134046, Dated Sep. 10, 2021, 8 pgs.

Korean Office Action for Application No. 10-2019-0097398, Dated Aug. 18, 2021, 15 pgs.

Korean Office Action for Application No. 10-2019-0097398, Dated Jun. 25, 2020, 11 pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005.14165v4 [cs.CL], Jul. 22, 2020, 75 pgs.

(56) References Cited

OTHER PUBLICATIONS

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Fan et al., "Augmenting Transformers with KNN-Based Composite Memory for Dialog", Transactions of the Association for Computational Linguistics, vol. 9, Mar. 1, 2021, pp. 82-99, doi: 10.1162/tacl_a_00356.

Fu et al., "Stylistic Retrieval-based Dialogue System with Unparallel Training Data", arXiv:2109.05477, Sep. 12, 2021, 9 pgs.

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029, doi: 10.18653/v1/2021.naacl-main.240.

Guu et al., "REALM: Retrieval-Augmented Language Model Pre-Training", Proceedings of the 37th International Conference on Machine Learning (ICML'20), vol. 119. JMLR.org, Article 368, 2020, arXiv:2002.08909v1 [cs.CL], Feb. 10, 2020, 12 pgs.

Han et al., "Meet Your Favorite Character: Open-domain Chatbot Mimicking Fictional Characters with only a Few Utterances", arXiv:2204.10825, Apr. 22, 2022, 19 pgs.

Holtzman et al., "The Curious Case of Neural Text Degeneration", International Conference on Learning Representations (ICLR), 2020, arXiv:1904.09751v2 [cs.CL], Feb. 14, 2020, 16 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373, doi: 10.18653/v1/2021.findings-emnlp.286.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lewis et al., "Retrieval-Augmented Generation for Knowledge-Intensive NLP Tasks", Proceedings of the 34th International Conference on Neural Information Processing Systems (NIPS), 2020, arXiv:2005.11401v4 [cs.CL], Apr. 12, 2021, 19 pgs.

Li et al., "A Diversity-Promoting Objective Function for Neural Conversation Models", Proceedings of the 2016 Conference of the North American Chapter of the Association for Computational Linguistics: Human Language Technologies, 2016, San Diego, California, Jun. 12-17, 2016, pp. 110-119, doi: 10.18653/v1/N16-1014.

Li et al., "Don't Say That! Making Inconsistent Dialogue Unlikely with Unlikelihood Training", Proceedings of the 58th Annual Meeting of the Association for Computational Linguistics, Jul. 2020, arXiv:1911.03860v2 [cs.CL], May 6, 2020, 15 pgs., doi: 10.18653/v1/2020.acl-main.428.

Liu et al., "How Not to Evaluate Your Dialogue System: an Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", Proceedings of the Conference on Empirical Methods in Natural Language Processing, Oct. 31-Nov. 4, 2018, arXiv:1809.01984v1 [cs.CL], Sep. 6, 2018, 5 pgs.

Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for building an open-domain chatbot", Conference of the European Chapter of the Association for Computational Linguistics, 2020, arXiv:2004.13637v2 [cs.CL], Apr. 30, 2020, 25 pgs.

Serban et al., "Multiresolution Recurrent Neural Networks: an Application to Dialogue Response Generation", Proceedings of AAAI Conference on Artificial Intelligence, vol. 31, Jun. 2016, arXiv:1606.00776v2 [cs.CL], Jun. 14, 2016, 21 pgs.

Welleck et al., "Neural Text Degeneration with Unlikelihood Training", International Conference on Learning Representations, ICLR, Aug. 2019, arXiv:1908.04319v2 [cs.LG], Sep. 26, 2019, 17 pgs.

Weston et al., "Retrieve and Refine: Improved Sequence Generation Models For Dialogue", Proceedings of the 2018 EMNLP Workshop SCAI: The 2nd International Workshop on Search-Oriented Conversational AI, 2018, arXiv:1808.04776v2 [cs.CL], Sep. 6, 2018, 6 pgs.

Wu et al., "Response Generation by Context-aware Prototype Editing", The 33rd AAAI Conference on Artificial Intelligence (AAAI-19), 2019, arXiv: 1806.07042v4 [cs.CL], Nov. 16, 2018, 9 pgs., doi: 10.1609/aaai.v33i01.33017281.

Yang et al., "A Hybrid Retrieval-Generation Neural Conversation Model", CIKM '19: Proceedings of the 28th ACM International Conference on Information and Knowledge Management, 2019, arXiv:1904.09068v1 [cs.IR], Apr. 19, 2019, 11 pgs., doi: 10.1145/3357384.3357881.

Zhang et al., "DIALOGPT: Large-Scale Generative Pre-training for Conversational Response Generation", Proceedings of the 58th Annual Meeting of the Association for Computational Linguistics, Jul. 5-10, 2020, pp. 270-278.

Zhang et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

* cited by examiner

SPEECH SYNTHESIS APPARATUS AND METHOD THEREOF

CROSS-REFERENCE TO RELATED APPLICATIONS

This application claims the benefit of Korean Patent Application No. 10-2020-0178870, filed on Dec. 18, 2020, in the Korean Intellectual Property Office, the disclosure of which is incorporated herein by reference.

BACKGROUND

1. Field of the Invention

The present disclosure relates to a speech synthesis apparatus and a method thereof, and more particularly, to an apparatus for acquiring second speech data and a target text, acquiring first information includes embedding information corresponding to the second speech data, acquiring second information including embedding information of the second speech data, the embedding information in relation with components generated based on a sequence of the target text, and acquiring audio data reflecting a characteristic of a speech of a speaker of the second speech data and corresponding to the target text based on the first information and the second information, and a method thereof.

2. Description of the Related Art

Text-to-speech synthesis technology for generating a human voice from text is actively studied. In particular, as neural network-based deep learning technologies are used in various fields, deep learning-based text-to-speech synthesis technologies have been studied.

However, typical deep learning-based text-to-speech synthesis technologies may not only require data corresponding to a speaker's speech recorded for more than one hour as well as a script corresponding to the recorded speech. In addition, there can be significant time and cost restrictions in preparing data for text-to-speech synthesis, such as having to perform a professional recording in a studio to exclude noise during the recording as much as possible.

Regarding this, prior documentation such as KR20170107683A and KR20190008137A may be referenced.

SUMMARY

An aspect provides a method and an apparatus for acquiring second speech data and target text, acquiring first information includes embedding information corresponding to the second speech data, acquiring second information including the embedding information of the second speech data, the embedding information in relation with components generated based on a sequence of the target text, and acquiring audio data reflecting characteristics of speech of a speaker of the second speech data and corresponding to the target text based on the first information and the second information.

Hereinafter, the terms "in relation with" may comprise meaning of having attention of attention operation method.

However, the goals to be achieved by example embodiments of the present disclosure are not limited to the objectives described above, and other objects may be inferred from the following example embodiments.

According to an aspect, there is provided a speech synthesis method using a text-to-speech synthesis model trained based on text data corresponding to first speech data and at least a portion of the first speech data, the speech synthesis method including acquiring second speech data and a target text, acquiring first information includes embedding information corresponding to the second speech data, acquiring second information including embedding information of the second speech data, the embedding information in relation with components generated based on a sequence of the target text, and acquiring audio data corresponding to the target text and reflecting characteristics of speech of a speaker of the second speech data based on the first information and the second information.

The first information may be embedding information including a vector corresponding to the second speech data and having a predetermined length independent of the length of the second speech data. The second information may be embedding information including a plurality of vectors to have a variable length.

A length of the second information may be variably determined based on a length of the target text.

The acquiring of the second information may include encoding the target text and extracting components according to a sequence of the target text generated based on the first information and the encoded target text.

The encoding the target text may include inputting the target text to a first model included in the text-to-speech synthesis model to produce the encoded target text, and the extracting of the components according to the sequence may include concatenating the encoded target text from the first model with the first information. The output of the first model may include a plurality of components generated based on a sequence of the target text and the first information.

The concatenating of the output of the first model with the first information may include copying the first information based on a number of the plurality of components included in the output of the first model and concatenating the copied first information for each of the plurality of components.

The acquiring of the second information may include inputting a result obtained by extracting components generated based on a sequence of the target text to a first neural network included in the text-to-speech synthesis model.

The acquiring of the second information may include inputting the second speech data to a second neural network included in the text-to-speech synthesis model, inputting the second speech data to a third neural network included in the text-to-speech synthesis model, and acquiring the second information based on an output of the second neural network, an output of the third neural network, and components generated based on a sequence of the target text.

The acquiring of the second information may include a plurality of detailed operations. A j-th detailed operation included in the plurality of detailed operations may correspond to acquiring a j-th component of the second information based on the target text and the first information.

The j-th detailed operation may correspond to acquiring the j-th component of the second information based on Equation 1 in which $e_v^j$ is the j-th component of the second information, $Q^j$ is a result of inputting a result obtained by extracting the j-th component according to the sequence of the target text generated based on the first information and the encoded target text to a first neural network included in the text-to-speech synthesis model, K is an output of a second neural network included in the text-to-speech synthesis model, V is an output of a third neural network included in the text-to-speech synthesis model, $d_m$ is a dimension of Q, f is a flattening function, and softmax is a softmax function.

$$e_v^j = \text{softmax}\left(\frac{f(Q^j)f(K)^T}{\sqrt{d_m}}\right)f(V) \qquad \text{[Equation 1]}$$

The second neural network and the third neural network will be described in greater detail with reference to FIG. 5.

The acquiring of the audio data may include acquiring third information based on a result obtained by inputting the second information and the components according to the sequence of the second speech data to a first neural network included in the text-to-speech synthesis model, inputting the third information to a fourth neural network included in the text-to-speech synthesis model, and acquiring audio data corresponding to the third information based on an output of the fourth neural network.

The text-to-speech synthesis model may include a first model configured to receive text information including at least one of the target text and the text data, encode the received text information, and output a result of the encoding, a second model configured to receive the first speech data or the second speech data and output embedding information corresponding to received speech data, a third model configured to receive the first speech data or the second speech data and output information including embedding information of speech data, the embedding information in relation with components generated based on a sequence of the text information, and a fourth model configured to acquire information on an alignment between the text information and speech data by receiving an output of the first model and an output of the second model and output a result of inputting the information including the embedding information and the information on the alignment to a neural network. The result output from the fourth model by inputting the information including the embedding information and the information on the alignment to the neural network is input to the third model so that the third model and the fourth model run in association with each other.

The text-to-speech synthesis model may be trained by acquiring the first speech data and the text data, encoding the text data, acquiring fourth information including information on an alignment between the first speech data and the text data in time based on embedding information corresponding to the first speech data and the encoded text data, acquiring fifth information including embedding information of the first speech data, the embedding information in relation with components generated based on a sequence of the text data, acquiring sixth information based on the fourth information and the fifth information, inputting the sixth information to a fourth neural network included in the text-to-speech synthesis model, and training on parameter information associated with the text-to-speech synthesis model based on an output of the fourth neural network.

The parameter information may include at least one weight information and at least one bias information associated with the text-to-speech synthesis model. The at least one weight information may include weight information associated with at least a portion of a first model, a second model, a third model, and a fourth model included in the text-to-speech synthesis model. The at least one bias information may include bias information associated with at least a portion of the first model, the second model, the third model, and the fourth model. At least a portion of the at least one weight information and the at least one bias information may be associated with a neural network included in at least a portion of the first model, the second model, the third model, and the fourth model.

The training on the parameter information may include training on the parameter information based on an output of the fourth neural network such that a correlation between the first speech data and the text data is learned.

According to another aspect, there is also provided a text-to-speech synthesis model for performing a speech synthesis method, the text-to-speech synthesis model including a first model configured to receive text information, encode the received text information, and output a result of the encoding, a second model configured to receive speech data and output embedding information corresponding to the received speech data, a third model configured to receive speech data and output information including embedding information of speech data, the embedding information in relation with components generated based on a sequence of the text information, and a fourth model configured to acquire information on an alignment between the text information and speech data by receiving an output of the first model and an output of the second model and output a result of inputting the information including the embedding information and the information on the alignment to a neural network, wherein the result output from the fourth model by inputting the information including the embedding information and the information on the alignment to the neural network is input to the third model so that the third model and the fourth model run in association with each other.

The text-to-speech synthesis model may further include a speech synthesizer configured to acquire audio data by receiving an output of the fourth model and output the acquired audio data.

According to another aspect, there is also provided a method of training a text-to-speech synthesis model, the method including acquiring first speech data and text data, encoding the text data, acquiring fourth information including information on an alignment between the first speech data and the text data in time based on embedding information corresponding to the first speech data and the encoded text data, acquiring fifth information including embedding information of the first speech data, the embedding information in relation with components generated based on a sequence of the text data, acquiring sixth information based on the fourth information and the fifth information, inputting the sixth information to a fourth neural network included in the text-to-speech synthesis model, and training on parameter information associated with the text-to-speech synthesis model based on an output of the fourth neural network.

Details of other example embodiments are included in the following detailed description and the accompanying drawings.

According to example embodiments, a speech synthesis method and apparatus may acquire embedding information by compressing information associated with speech data into a single vector and acquire embedding information corresponding to speech data, the embedding information in relation with components generated based on a sequence of text data or the target text, thereby acquiring audio data reflecting a characteristic of a specific speaker using a relatively small quantity of speech data.

Effects of the present disclosure are not limited to those described above, and other effects may be made apparent to those skilled in the art from the following description.

DETAILED DESCRIPTION

Figure 1:
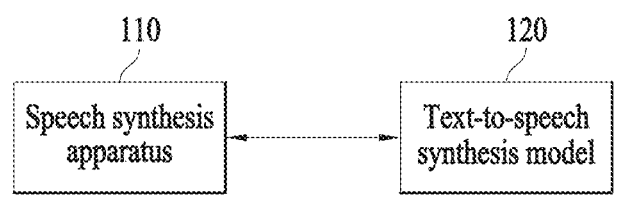
FIG. 1 is a diagram illustrating a speech synthesis system according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" or "comprising" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general-purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 is a block diagram illustrating a speech synthesis system according to an example embodiment.

According to various example embodiments, a speech synthesis system may include a speech synthesis apparatus 110 and a text-to-speech synthesis model 120. Depending on embodiments, the speech synthesis system may additionally include a network that supports data transmission and reception between at least some of the speech synthesis apparatus 110 and the text-to-speech synthesis model 120.

The speech synthesis apparatus 110 may include a transceiver, a memory, and a processor. In addition, when the text-to-speech synthesis model 120 is implemented as an independent physical device, the text-to-speech synthesis model 120 may include a transceiver, a memory, and a processor. Alternatively, when the text-to-speech synthesis model 120 is included in a specific physical device, the specific physical device may include a transceiver, a memory, and a processor. Each of the speech synthesis apparatus 110 and the text-to-speech synthesis model 120 may be a unit that performs at least one function or operation, which may be implemented by hardware or software, or a combination of hardware and software. Meanwhile, in the overall example embodiments, the speech synthesis apparatus 110 and the text-to-speech synthesis model 120 are referred to as separate devices or servers, but they may be logically divided structures and implemented as separate functions in a single server. In some cases, the speech synthesis apparatus 110 may be implemented to include the text-to-speech synthesis model 120. Hereinafter, for ease and convenience, a description will be made based on a case in which the speech synthesis apparatus 110 and the text-to-speech synthesis model 120 are divided devices or servers.

According to an example embodiment, the speech synthesis apparatus 110 and the text-to-speech synthesis model 120 may include a plurality of computer systems implemented as network servers or computer software. For example, at least some of the speech synthesis apparatus 110 and the text-to-speech synthesis model 120 may refer to a computer system and computer software connected to a lower level device capable of communicating with another network server through a computer network such as an intranet or the Internet to receive a request to perform a task, perform the task, and/or provide a result of the task. In addition, at least some of the speech synthesis apparatus 110 and the text-to-speech synthesis model 120 may be understood as broad concepts including a series of application programs that can operate on a network server and various databases built therein. At least some of the speech synthesis apparatus 110 and the text-to-speech synthesis model 120 may be implemented using a network server program that is provided in various ways based on an operating system such as DOS, WINDOWS, LINUX, UNIX, or MACOS, for example.

The speech synthesis apparatus 110 is an apparatus that can synthesize speech and may be implemented by, for example, one or more software modules, one or more hardware modules, or various combinations thereof. The speech synthesis apparatus 110 may synthesize speech using the text-to-speech synthesis model 120 trained based on first speech data and text data corresponding to at least a portion of the first speech data. Specifically, the speech synthesis apparatus 110 may acquire second speech data and a target text, acquire first information includes embedding information corresponding to the second speech data, acquire second information including embedding information of the second speech data, the embedding information in relation with components generated based on a sequence of the target text, and acquire audio data reflecting characteristics of speech of a speaker of the second speech data and corresponding to the target text based on the first information and the second information.

According to an embodiment, components generated based on the sequence of the target text may comprise an attention query of attention operation method.

The first speech data and at least a portion of the text data may correspond to each other. For example, the first speech data may include recorded data of a word "annyeonghaseyo" (which means "hello" in the English language), and the text data may include a text "annyeonghaseyo." On the other hand, the second speech data and the target text may not correspond to each other. For example, when the target text is "sigsahabsida" (which means "let's have a meal" in the English language), the second speech data may not include data corresponding to "sigsahabnida".

The first information may include embedding information with a predetermined length in which at least one characteristic corresponding to the second speech data is compressed and reflected. The predetermined length of the embedding information (i.e. the number of vectors included in the embedding information) is independent of the length of the second speech data. For example, the first information may include embedding information with a single vector. The vector included in the first information may not be located in a temporal dimension. However, the vector included in the first information may still include temporal information such as an utterance speed of a speaker.

Meanwhile, the second information, which corresponds to embedding information with variable length value, may include a plurality of vectors reflecting characteristics of at least a portion of speech corresponding to the second speech data. The second information may include a plurality of vectors whose number is determined based on a length of the target text. The plurality of vectors included in the second information may be located in one or more temporal dimensions.

The first information may reflect at least one characteristic corresponding to the second speech data, but it doesn't mean that the length value of the first information may be determined based on the second speech data. Rather, it should be understood in a manner that the first information may have its own (unique) predetermined length value, and the first information may reflect at least one characteristic corresponding to the second speech data with its length unchanged.

The first speech data and the second speech data may correspond to different speech data. That is, speech data for training the text-to-speech synthesis model 120 and speech data for acquiring the audio data corresponding to the target text may correspond to different speech data. In relation to this, when the second speech data is used to acquire the audio data, characteristics of the second speech data may be reflected in synthesized audio data.

At least one of the first speech data, the second speech data, and the audio data may correspond to an image represented as a graph by visualizing a sound spectrum. The image represented as a graph by visualizing a sound spectrum may correspond to a spectrogram. A related description will be made in greater detail with reference to FIG. 7.

Hereinafter, for convenience in the following descriptions, an operation of training the text-to-speech synthesis model 120 is referred to as a "training stage", and an operation of acquiring the second speech data and the target text, acquiring the first information corresponding to the second speech data using the trained text-to-speech synthesis model and the second information including embedding information of the second speech data, and/or acquiring the audio data reflecting characteristics of speech of a speaker of the second speech data and corresponding to the target text based on the first information and the second information is referred to as an "inference stage."

In the training stage, the speech synthesis apparatus 110 may acquire embedding information corresponding to the first speech data. Specifically, in the training stage, the speech synthesis apparatus 110 can extract fifth information including embedding information of the first speech data, the embedding information in relation with components generated based on a sequence of the text data and embedding information including a single vector based on the first speech data including a speech of a predetermined speaker. Meanwhile, as will be described later, in the inference stage, the speech synthesis apparatus 110 can acquire the second information including embedding information of the second speech data, the embedding information in relation with components generated based on a sequence of the target text and the first information includes embedding information corresponding to the second speech data.

The embedding information including the single vector acquired in the training stage and the first information acquired in the inferring information may have fixed(predetermined) lengths. In contrast, the fifth information acquired in the training stage and the second information acquired in the inference stage may include a plurality of vectors and thus, may have variable lengths. Specifically, the fifth information may be variably determined based on a length of the text data, and the second information may be variably determined based on a length of the target text.

The second information can include embedding information generated only for the target text and thus, may reflect information such as emotion and rhyme of when the target text is spoken. In contrast, the first information can include information acquired as a result of compressing information associated with the second speech data into a single vector and thus, may have a reduced bias of information due to emotion and rhyme of when the target text is spoken. Accordingly, the first information may be stabilized information in which emotions, rhymes, and the like are not reflected more than necessary.

According to an example embodiment, to generate the first information in a form of fixed-length embedding, a plurality of items of speech information (e.g., portions of input audio data) included in the first speech data may have predetermined lengths. In this case, the plurality of items of speech information included in the first speech data may correspond to information generated as a result obtained by performing padding to correspond to a preset length. For example, a length of predetermined audio to be included in the first speech data may be three seconds and a preset length may be five seconds. In this example, speech information corresponding to the preset length may be acquired by concatenating a silent area for two seconds with a latter part of the audio.

In some cases, a preset length may correspond to a length of a longest audio among a plurality of audios to be included in the first speech data. For example, when lengths of three audios to be included in the first speech data are three seconds, five seconds, and seven seconds, the preset length may be seven seconds.

According to an example embodiment, the speech synthesis apparatus 110 may receive a user input including at least a portion of the first speech data, the text data corresponding to at least a portion of the first speech data, the second speech data, and/or the target text from a user, thereby acquiring at least a portion of the first speech data, the text data corresponding to at least a portion of the first speech data, the second speech data, and/or the target text.

The text-to-speech synthesis model 120 may be a model used by the speech synthesis apparatus 110 for speech synthesis. The text-to-speech synthesis model 120 may be a model including at least one of one or more neural networks, one or more encoders, one or more decoders, and/or one or more speech synthesizers. After a training process performed based on the first speech data and the text data corresponding to at least a portion of the first speech data, the text-to-speech synthesis model 120 may perform an operation of acquiring the first information and the second information based on the second speech data and acquiring the audio data reflecting characteristics of speech of a speaker of the second speech data and corresponding to the target text based on the first information and the second information. In relation to this, through the training process, parameter information associated with the text-to-speech synthesis model 120 may be learned. A description related to the learned parameter information will be made in greater detail with reference to FIG. 3.

According to an example embodiment, a user may directly synthesize speech using the text-to-speech synthesis model 120. In this case, a user may initiate or separately perform various portions of the text-to-speech synthesis, such as (but not limited to) training a text-to-speech synthesis model based on the first speech data and the like, acquiring audio data reflecting characteristics of speech of a speaker of the second speech data based on the second speech data, etc. Hereinafter, for ease and convenience, a description will be made based on an example in which the speech synthesis apparatus 110 receives a user input and synthesizes speeches using the text-to-speech synthesis model 120.

A network may serve to connect the speech synthesis apparatus 110 to the text-to-speech synthesis model 120 or other external devices. For example, a network 130 may provide an access path such that the text-to-speech synthesis model 120 is connected to the speech synthesis apparatus 110 to transmit and receive packet data to and from the speech synthesis apparatus 110.

According to the present disclosure, the speech synthesis apparatus 110 may acquire embedding information by compressing information associated with speech data into a single vector and acquire embedding information of speech data, the embedding information in relation with components generated based on a sequence of the text data or the target text. Through this, the speech synthesis apparatus 110 may acquire audio data reflecting characteristics of speech of a predetermined speaker using a relatively small amount of speech data. A series of operations related to a speech synthesis method according to various example embodiments may be implemented by a single physical device, or may be implemented by a plurality of physical devices. For example, some of the components included in the speech synthesis system may be implemented by one physical device, and the remaining components may be implemented as another physical device. For example, one physical device may be implemented as a part of the speech synthesis apparatus 110, and another physical device may be implemented as a part of the text-to-speech synthesis model 120 or a part of an external device. In some cases, components included in the speech synthesis apparatus 110 or the text-to-speech synthesis model 120 may be distributed and arranged in different physical devices. The distributed components may be combined to perform functions and operations of the speech synthesis system. For example, the speech synthesis apparatus 110 of the present disclosure may include at least one sub-device. Some operations described as being performed by the speech synthesis apparatus 110 may be performed by a first sub-device, and some other operations may be performed by a second sub-device.

Figure 2:
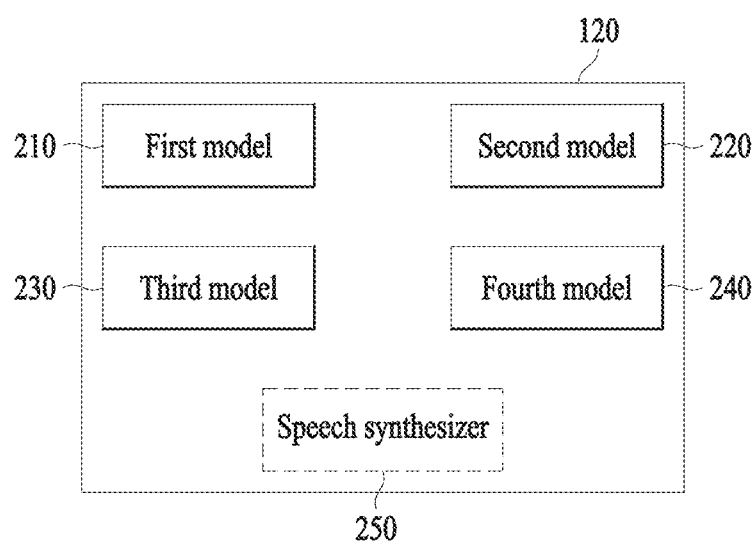
FIG. 2 is an exemplary diagram illustrating a configuration of a text-to-speech synthesis model according to an example embodiment.

FIG. 2 is an exemplary diagram illustrating a configuration of a text-to-speech synthesis model according to an example embodiment.

Referring to FIG. 2, the text-to-speech synthesis model 120 according to an example embodiment includes a first model 210, a second model 220, a third model 230, and a fourth model 240. The first model 210 may correspond to a Tacotron encoder, the second model 220 may correspond to a coarse-grained encoder, the third model 230 may correspond to a fine-grained encoder, and the fourth model 240 may correspond to a Tacotron decoder. In numerous embodiments, the second model may generate fixed-length global embeddings and the third model may extract variable-length embeddings that maintain a temporal dimension of the data.

The third model 230 may serve as an encoder. Specifically, the third model 230 receives speech data, encodes the received speech data, and acquires information including embedding information of speech information, the embedding information in relation with components generated based on a sequence of a text. For example, the third model 230 may acquire second information including embedding information of second speech data, the embedding information in relation with components generated based on a sequence of a target text or acquire fifth information including embedding information of first speech data, the embedding information in relation with components generated based on a sequence of text data.

The third model 230 may interoperate with the fourth model 240 to output information reflecting characteristics of speech of a speaker. For example, the third model 230 may further use information received from the fourth model 240 to acquire the second information and the fifth information.

The fourth model 240 may serve as a decoder. The fourth model 240 may acquire information on an alignment between a text and speech data. Specifically, the fourth model 240 may receive an output of the first model 210 and an output of the second model 220, determine information on an alignment between text data and speech data, and output a result obtained by concatenating information including embedding information corresponding to at least a portion of text information and the information on the alignment. For example, in an inference stage, the fourth model 240 may concatenate information on the encoded target text, which is an output of the first model 210, and the first information which is an output of the second model 220 the fourth model may input the concatenated information to a neural network. For example, the fourth model may input the concatenated information, which may comprise a spectrogram of the target text, to the speech synthesizer 250, and acquire the audio data from the speech synthesizer 250.

Specifically, the second detailed model and the first neural network can receive the encoded text and the first information. The second detailed model and the first neural network can generate embedding information (503) based on the encoded text and the first information. The embedding information 503 can comprises components aligned according to the sequence of the text data. The embedding information 503 can comprises the alignment between the text data and the audio data. The embedding information 503 corresponds to the audio data in time domain. The embedding information 503 can comprises the components of the text data aligned based on the alignment between the text data and the audio data. The second detailed model can be a location sensitive attention and the first neural network can be a LSTM layers.

The information on the alignment between the text data and the audio data may include information obtained by determining time parts corresponding to texts "an", "nyeong", "ha", "se", and "yo" in association with a sequence of a text "annyeonghaseyo" and speech data (corresponding to the text or not corresponding to the text).

The information on the alignment between the text data and the audio data may comprise information on "attention" between the text data and the audio data. This may include determining an output audio (or, embedding information for generating output audio) by determining how to transform components of the encoded text data. In this regard, determining how to transform components of the encoded text data may comprise determining speed of the transformation, time (or period) of the transformation and a number of vectors to be generated by the transformation. Hereinafter, for ease and convenience, a description will be made based on a case in which the information on the alignment between the text data and the audio data corresponds to the information on "attention" between the text data and the audio data.

On the other hand, the "attention" of the attention operation method performed by the first detailed model may be distinguished from the alignment between the text data and the audio data performed by second detailed model, since the "attention" of the attention operation perfomed by the first detailed model may comprise a relation between an output audio (or, embedding information for generating output audio) and second speech 401.

The first detailed model can receive the embedding information 503, the output 506 of the second neural network and the output 505 of the third neural network. The first detailed model can be an attention module. The embedding information 503 may comprise an attention query of attention operation method, the output 506 of the second neural network may comprise an attention key of attention operation method, and the output 505 of the third neural network may comprise an attention value of attention operation method. The first detailed model can generate the second information 507 based on the alignment between the audio data and the speech data. The first detailed model can generate the second information 507 based on the alignment between the embedding information 503 and the speech data.

The second speech 401 will be described in greater detail with reference to FIG. 4.

The fourth model 240 may transfer the determined information on the alignment between the text data and the speech data to the third model 230. The third model 230 may acquire embedding information having a variable length based on the received information.

In addition, the fourth model 240 may determine whether certain information satisfies a preset condition. Based on a result of the determination, the fourth model 240 may perform an operation of training the text-to-speech synthesis model 120 or acquiring audio data reflecting characteristics of speech of a predetermined speaker.

The first model 210 may be an encoder that receives the text data, encodes the received text data, and outputs a result of the encoding. For example, the first model 210 may receive text data corresponding to at least a portion of the first speech data and output information obtained by encoding the received text data, or receive a target text and output information obtained by encoding the received target text.

The second model 220 may receive speech data, encode the received speech data, and output embedding information corresponding to the received speech data as a result of the encoding. As such, the second model 220 may serve as an encoder. For example, the second model 220 may receive the first speech data and acquire embedding information corresponding to the first speech data, or receive the second speech data and acquire first information includes embedding information corresponding to the second speech data.

According to an example embodiment, the second model 220 may include at least one of a convolutional layer, a long short-term memory (LSTM) layer, and a pooling layer.

Speech data received by the third model 230 and speech data received by the second model 220 do not necessarily correspond to each other. For example, in a training stage, the second model 220 may acquire embedding information based on the first speech data, wherein the embedding information has a predetermined length independent of the length of the first speech data, while the third model 230 acquires fifth information based on third speech data different from the first speech data. Also, in the inference stage, the second model 220 may acquire the first information based on the second speech data while the third model 230 acquires second information based on fourth speech data different from the second speech data. Hereinafter, for each and convenience, a description will be made based on an example in which the third model 230 acquires the fifth information based on the first speech data and acquires the second information based on the second speech data.

According to an example embodiment, the text-to-speech synthesis model 120 may further include a speech synthesizer 250. The speech synthesizer 250 may acquire audio data by receiving an output of the fourth model 240 and output the acquired audio data. For example, the speech synthesizer 250 may convert audio data in a form of a spectrogram into an audio file to be heard by a person.

The first model 210, the second model 220, the third model 230, the fourth model 240, and the speech synthesizer 250 should be understood as conceptually or logically distinct components, and do not necessarily be implemented as physically distinct components. In addition, at least some of the operations described as being performed by the first model 210, the second model 220, the third model 230, the fourth model 240, and the speech synthesizer 250 may also be performed by other components included in the text-to-speech synthesis model 120. Further, the operations expressed as being performed by the first model 210, the second model 220, the third model 230, the fourth model 240, and the speech synthesizer 250 should be understood as an operation performed by the speech synthesis apparatus 110 using the text-to-speech synthesis model 120.

Operations performed by the first model 210, the second model 220, the third model 230, and the fourth model 240 in the training stage will be described in greater detail with reference to FIG. 3. Operations performed by the first model 210, the second model 220, the third model 230, the fourth model 240, and the speech synthesizer 250 in the inference stage will be described in greater detail with reference to FIG. 4. Structures of the third model 230 and the fourth model 240 will be described in greater detail with reference to FIG. 5.

Figure 3:
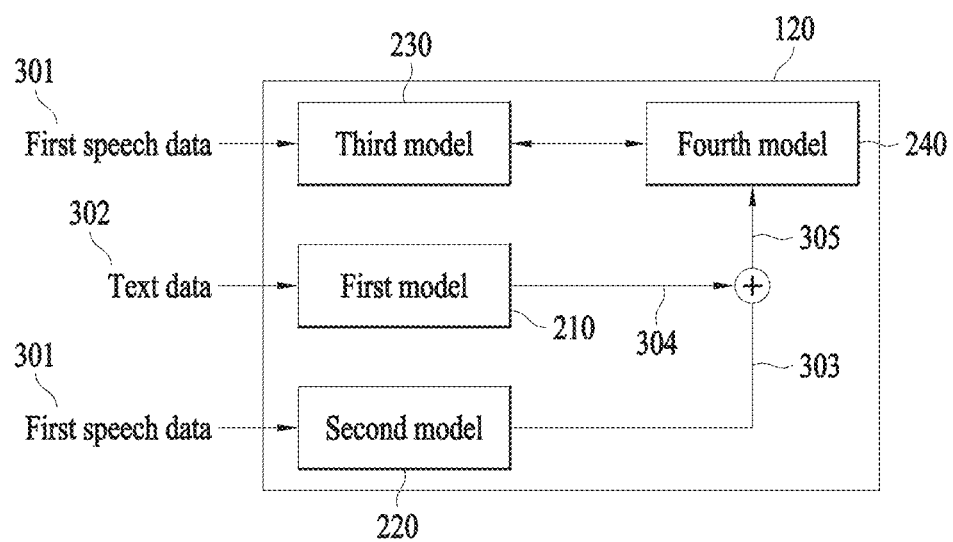
FIG. 3 is an exemplary diagram illustrating an operation of training a text-to-speech synthesis model according to an example embodiment.

FIG. 3 is an exemplary diagram illustrating an operation of training a text-to-speech synthesis model according to an example embodiment.

Referring to FIG. 3, the text-to-speech synthesis model 120 according to an example embodiment may acquire first speech data 301 and text data 302 corresponding to at least a portion of the first speech data 301. Specifically, the first speech data 301 may be input to the third model 230 and input to the second model 220. In addition, the text data 302 may be input to the first model 210.

In some cases, third speech data distinguished from the first speech data 301 may be input to the third model 230 while the first speech data 301 is input to the second model 220. As described with reference to FIG. 2, an example in which the third model 230 acquires fifth information based on first speech data will be described for brevity.

In some cases, among the first speech data 301, only a portion corresponding to the text data 302 may be input to the second model 220 while the first speech data 301 is input to the third model 230 without change. A related description will be made in greater detail with reference to FIG. 7.

The text-to-speech synthesis model 120 in accordance with some embodiments of the invention can acquire embedding information 303 having a predetermined length and reflecting characteristics of speech corresponding to the first speech data 301. As described above, the embedding information 303 having a predetermined length and reflecting characteristics of speech corresponding to the first speech data 301 may include a single vector in which the characteristic corresponding to the first speech data is compressed and reflected. Specifically, the embedding information 303 corresponding to the first speech data 301 may include information on various characteristics of speech from the speaker of the first speech data 301, such as (but not limited to) an utterance speed, intonation, accent, etc.

The text-to-speech synthesis model 120 may acquire fourth information 305 including information on an alignment between the first speech data 301 and the text data 302 in time based on the text data 302 and the embedding information 303 corresponding to the first speech data 301 and having a predetermined length independent of the length of the first speech data. In an example embodiment, the text-to-speech synthesis model 120 may acquire the fourth information 305 by concatenating the text data 302 and the embedding information 303 corresponding to the first speech data 301 and having a predetermined length independent of the length of the first speech data. In an example embodiment, the text-to-speech synthesis model 120 may concatenate the text data 302 and the embedding information 303 without change, or concatenate information obtained by processing the text data 302 and the embedding information 303. For example, the first model 210 may output encoded text data 304 based on the text data 302 received. Also, the text-to-speech synthesis model 120 may concatenate an output (that is, the encoded text data 304) of the first model 210 in the training stage and the embedding information 303 corresponding to the first speech data 301 and having a predetermined length independent of the length of the first speech data.

When concatenating the text data 302 with the embedding information 303 without change, the text-to-speech synthesis model 120 may copy the embedding information 303 based on a number corresponding to a plurality of components included in the text data and concatenate the copied embedding information 303 for each of the plurality of components. When concatenating the output of the first model 210 with the embedding information 303 corresponding to the first speech data 301 and having a predetermined length independent of the length of the first speech data, the text-to-speech synthesis model 120 may copy the embedding information 303 based on a number corresponding to a plurality of components included in the output of the first model 210 in the training stage and concatenate the copied embedding information 303 for each of the plurality of components of the output of the first model 210 corresponding to each of a plurality of messages.

The plurality of components included in the text data 302 may include components obtained by classifying messages included in the text data according to a sequence. For example, a plurality of components may include a first component corresponding to "an" of a text "annyeonghaseyo", a second component corresponding to "nyeong", a third component corresponding to "ha", a fourth component corresponding to "se", and a fifth component corresponding to "yo." Even when a component obtained by dividing the messages included in the text data 302 according to the sequence is included, the component may not necessarily be allocated for each letter, and a component separated in various ways may be included. For example, a component of the text data 302 may be a syllable, a letter, or a morpheme of a semantic unit.

In the training stage, a plurality of components included in the output of the first model 210 may include a component obtained by dividing a message included in the output of the first model 210 according to a sequence. An example related to a plurality of components included in the text data 302 may apply to an example related to the plurality of components included in the output of the first model 210.

An example of concatenating the text data 302 with the embedding information 303 or concatenating the encoded text data 304 with the embedding information 303 will be described in greater detail with reference to FIG. 6.

According to an example embodiment, the text-to-speech synthesis model 120 may perform an additional operation based on the text data 302 and the embedding information 303 corresponding to the first speech data 301, thereby acquiring the fourth information 305 including information on an alignment between the first speech data 301 and the text data 302 in time. In the training stage, the first speech data 301 may include speech data corresponding to the text data 302. Accordingly, the information on the alignment between the first speech data 301 and the text data 302 may include information obtained by determining time portions of speech data corresponding to texts "an", "nyeong", "ha", "se", and yo" in association with speech data (for example, data in which "annyeonghaseyo" is recorded) and a sequence of a text (for example, "annyeonghaseyo"). That is, in the training stage, since a text and a speech correspond to each other, an alignment may be effectively performed, and training may be performed while a speaking speed of a speaker is reflected.

The additional operation for acquiring the fourth information 305 may be performed in various ways. According to an example embodiment, the fourth information 305 may be acquired based on a content-based attention operation method, which can be calculated based on various methods for computing and adjusting alignments. That is, adjusting an alignment may be performing an operation according to an attention operation method for each component of the text data 302 based on an utterance speed of a speaker.

According to an example embodiment, a result obtained by performing an operation may be input to a first neural network included in the text-to-speech synthesis model 120, and an output thereof may correspond to the fourth information 305. In this case, the first neural network may be included in the fourth model 240. The first neural network may include, for example, a long short-term memory layer.

Meanwhile, the text-to-speech synthesis model 120 acquires fifth information including embedding information of the first speech data 301, the embedding information in relation with components generated based on a sequence of the text data 302. Specifically, the third model 230 may input the first speech data 301 to a second neural network included in the text-to-speech synthesis model 120 and acquire an output thereof. According to an example embodiment, the third model 230 may acquire the fifth information based on the information on the alignment between the text data 302 and the first speech data 301 and an output of the second neural network. According to an example embodiment, the third model 230 may further input the first speech data 301 to a third neural network included in the text-to-speech synthesis model 120 and acquire the fifth information based on the output of the second neural network, an output of the third neural network, and the information on the alignment between the text data 302 and the first speech data 301. In this case, at least one of the second neural network and the third neural network may be included in the third model 230.

The second neural network and the third neural network will be described in greater detail with reference to FIG. 5.

According to an example embodiment, an operation of acquiring the fifth information may include a plurality of detailed operations. A j-th detailed operation included in the plurality of detailed operations related to acquiring the fifth information may correspond to an operation of acquiring a j-th component of the fifth information based on embedding of the first speech data 301 and a j-th component according to the sequence of the text data 302. In relation to this, each detailed operation may be performed based on an auto-regressive scheme in which the j-th component is acquired based on a value of a (j−1)-th component and a (j+1)-th component is acquired based on a value of the j-th component, for example.

The text-to-speech synthesis model 120 may acquire the fifth information corresponding to the first speech data, acquire sixth information based on the fourth information 305 and the fifth information, input the sixth information to a fourth neural network included in a text-to-speech synthesis model, and train (or update) parameter information associated with the text-to-speech synthesis model 120. Parameter information in accordance with a variety of embodiments of the invention can include (but is not limited to) model weights, hyperparameters, etc. Specifically, the third model 230 may receive the first speech data 301, output the fifth information by receiving the fourth information 305 from the fourth model 240, and transmit the fifth information to the fourth model 240, so that the fourth model 240 acquires the sixth information based on the fourth information 305 and the fifth information (for example, by concatenating the fourth information 305 and the fifth information) and inputs the sixth information to the fourth neural network. In this case, the fourth neural network may be included in the fourth model 240.

The parameter information may include at least one bias information and at least one weight information associated with the text-to-speech synthesis model 120. The at least one weight information may include weight information associated with at least a portion of the first model 210, the second model 220, the third model 230, and the fourth model 240 included in the text-to-speech synthesis model 120. The at least one bias information may include bias information associated with at least a portion of the first model 210, the second model 220, the third model 230, and the fourth model 240. For example, the weight information and the bias information may include information associated with a parameter (including a parameter corresponding to the fourth model 240) associated with an alignment and a parameter (including a parameter corresponding to the third model 230) associated with acquirement of the fifth information.

According to an example embodiment, parameter information associated with the first model 210, the second model 220, the third model 230, and the fourth model 240 included in the text-to-speech synthesis model 120 may be learned based on an end-to-end scheme overall.

At least a portion of the at least one weight information and the at least one bias information may be associated with a neural network included in at least a portion of the first model, the second model, the third model, and/or the fourth model. Specifically, at least a portion of the at least one weight information and the at least one bias information may be associated with a value of a component related to a neural network.

The learned parameter information may be used in an inference stage later.

According to an example embodiment, the text-to-speech synthesis model 120 may train on the first speech data 301 and the text data 302 based on an output of the fourth neural network included in the fourth model 240. For example, the text-to-speech synthesis model 120 may determine whether the output of the fourth neural network satisfies a preset condition, thereby determining whether the fourth information 305 satisfies the preset condition and training on the parameter information associated with the text-to-speech synthesis model 120. For example, the parameter information associated with the text-to-speech synthesis model 120 may be learned by adjusting the parameter information only when the output of the fourth neural network satisfies the preset condition.

In some cases, the parameter information associated with the text-to-speech synthesis model 120 may be learned without determining whether the output of the fourth neural network satisfies the preset condition. In such cases, for example, the fourth neural network may not be included in the text-to-speech synthesis model 120.

According to an example embodiment, the text-to-speech synthesis model 120 may train (or update) the parameter information based on the output of the fourth neural network such that a correlation between the first speech data 301 and the text data 302 is learned. According to an embodiment of the invention, parameter information of the text-to-speech synthesis model 120 may be learned by comparing the first speech data 301 and the output of the fourth model 240. In relation to this, the parameter information may be learned such that a loss (or difference) between the first speech data 301 and speech data generated based on the text data 302 using the text-to-speech synthesis model 120 is minimized (or reduced).

According to an embodiment, the loss between the first speech data 301 and speech data generated based on the text data 302 may comprise a difference between a generated spectrogram corresponding to the first speech data 301 and a spectrogram corresponding to the text data 302.

According to an embodiment, the loss between the first speech data 301 and speech data generated based on the text data 302 may comprise a preset value which is related to timepoint in which generation of audio must be finished. In this regard, the preset value may be generated based on the preset condition. The preset condition and the preset value may be one of the parameter information which can be learned by comparing the first speech data 301 and the output of the fourth model 240 such that a loss (or difference) between the first speech data 301 and speech data generated based on the text data 302 using the text-to-speech synthesis model 120 is minimized (or reduced).

In conclusion, parameter information associated with the first model 210, the second model 220, the third model 230, and the fourth model 240 included in the text-to-speech synthesis model 120 may be learned based on an end-to-end scheme overall.

The acquirement of the fifth information, the first neural network, and the fourth neural network will be described in greater detail with reference to FIG. 5.

Figure 4:
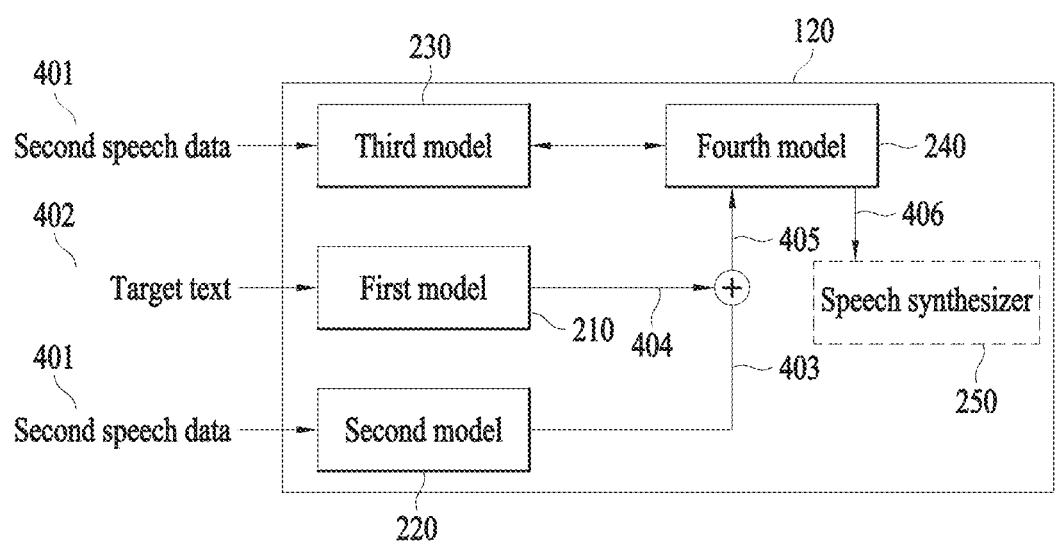
FIG. 4 is an exemplary diagram illustrating an operation of synthesizing speeches using a trained text-to-speech synthesis model according to an example embodiment.

FIG. 4 is an exemplary diagram illustrating an operation of synthesizing speeches using a trained text-to-speech synthesis model according to an example embodiment.

Referring to FIG. 4, according to an example embodiment, a trained text-to-speech synthesis model, for example, the text-to-speech synthesis model 120 may acquire second speech data 401 and a target text 402. The second speech data 401 may be input to the third model 230 and the second model 220. In addition, the target text 402 may be input to the first model 210.

In some cases, fourth speech data distinguished from the second speech data 401 may be input to the third model 230 while the second speech data 401 is input to the second model 220. As described with reference to FIG. 2, for ease and convenience, the following description will be made based on an example in which the third model 230 acquires second information based on second speech data.

The trained text-to-speech synthesis model 120 may acquire information corresponding to reference numeral 405 by concatenating the target text 402 and the first information 403 acquired in the operation, which is similar to concatenating text data 302 and embedding information 303. The first information 403 may be information including a characteristic corresponding to the second speech data. Depending on examples, the information corresponding to the reference numeral 405 may be acquired by directly concatenating the first information 403 and the target text 402 and may also be acquired by concatenating the first information 403 and processed information of the target text 402. For example, the first model 210 may output encoded text data 404 based on the target text 402 received, so that the trained text-to-speech synthesis model 120 acquires information corresponding to the reference numeral 405 by concatenating the first information 403 and an output (e.g., the encoded text data 404) of the first model 210.

The first information 403 may include a single vector in which the characteristic corresponding to the second speech data is compressed and reflected, as embedding having a fixed length value like the embedding information having the predetermined length and corresponding to the first speech data 301 in the training stage. Specifically, the first information 403 may include information on an utterance speed of a speaker of the second speech data 401.

The trained text-to-speech synthesis model 120 may acquire information (corresponding to the reference numeral 405) on an alignment between the second speech data 401 and the target text 402 in time based on the first information 403 and the target text 402. In an inference stage, the second speech data 401 may include speech data corresponding to the target text 402. Accordingly, in association with speech data (for example, data in which "annyeonghigaseyo" (which means "goodbye" in the English language) is recorded) and a sequence of a text (for example, "annyeonghaseyo"), the information on the alignment between the target text 402 and the second speech data 401 may include information obtained by determining time portions of speech data corresponding to texts "an", "nyeong", "ha", "se", and "yo." In the inference stage, although a text and a speech may not correspond to each other, the first information 403 may reflect information on a speed of a speaker. Thus, the utterance speed of the speaker may be learned and information on an alignment may be acquired.

An operation for acquiring the information on the alignment between the target text 402 and the second speech data 401 may be performed in various ways. An additional operation for acquiring the information corresponding to the reference numeral 405 may be performed in various ways. According to an example embodiment, the information corresponding to the reference numeral 405 may be acquired based on a content-based attention operation method, which can be calculated based on typical methods. That is, adjusting an alignment may be performing an operation according to an attention operation method for each component of the target text 402 based on the utterance speed of the speaker.

Meanwhile, the trained text-to-speech synthesis model 120 acquires second information including embedding information of the second speech data 401, the embedding information in relation with components generated based on a sequence of the target text 402. Specifically, the third model 230 may input the second speech data 401 to the second neural network included in the text-to-speech synthesis model 120 and acquire an output thereof. According to an example embodiment, the third model 230 may acquire the second information based on the information on the alignment between the second speech data 401 and the target text 402 and the output of the second neural network. According to an example embodiment, the third model 230 may further input the second speech data 401 to the third neural network included in the text-to-speech synthesis model 120 and acquire the second information based on the information on the alignment between the second speech data 401 and the target text 402, the output of the second neural network, and an output of the third neural network. In this case, at least one of the second neural network and the third neural network may be included in the third model 230.

According to an example embodiment, an operation of acquiring the second information may include a plurality of detailed operations. A j-th detailed operation included in the plurality of detailed operations related to acquiring the second information may correspond to an operation of acquiring a j-th component of the second information based on the target text 402 and the first information 403. In relation to this, each detailed operation may be performed based on an auto-regressive scheme in which the j-th component is acquired based on a value of a (j−1)-th component and a (j+1)-th component is acquired based on a value of the j-th component, for example.

The acquirement of the second information will be described in greater detail with reference to FIG. 5.

The text-to-speech synthesis model 120 may acquire third information 406 by concatenating the second information and the information on the alignment between the second speech data 401 and the target text 402. Specifically, the third model 230 may transmit the acquired second information to the fourth model 240, so that the fourth model 240 acquires the third information 406.

Further, according to an example embodiment, the text-to-speech synthesis model 120 may acquire audio data corresponding to the third information 406. Specifically, the fourth model 240 may input the acquired third information 406 to the fourth neural network, transmit at least one of the third information 406 and an output of the fourth neural network corresponding to the third information 406 to the speech synthesizer 250, and acquire the audio data from the speech synthesizer 250.

The operations of the inference stage described with reference to FIG. 4 may be performed based on parameter information learned in the training stage.

Figure 5:
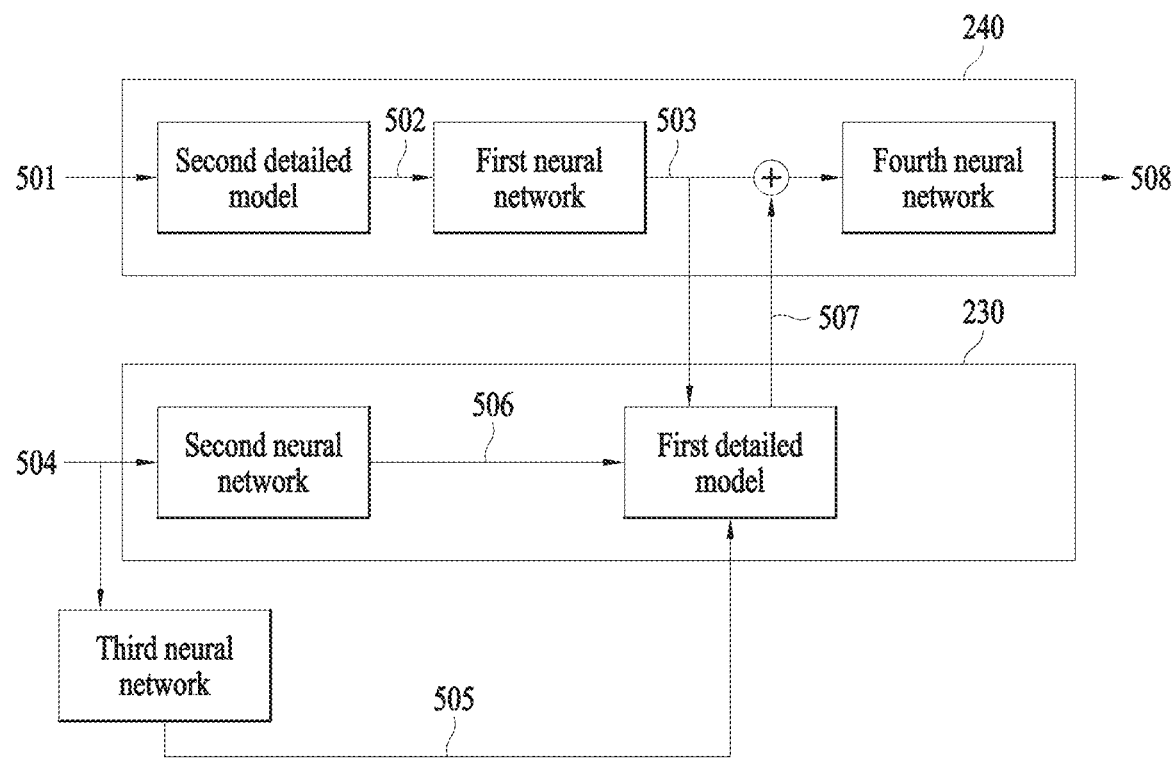
FIG. 5 is an exemplary diagram illustrating configurations of a third model and a fourth model included in a text-to-speech synthesis model according to an example embodiment.

FIG. 5 is an exemplary diagram illustrating configurations of a third model and a fourth model included in a text-to-speech synthesis model according to an example embodiment.

Referring to FIG. 5, according to an example embodiment, the fourth model 240 may include at least one of a second detailed model, a first neural network, and a fourth neural network. The first neural network may include, for example, a plurality of long short-term memory layers. The fourth neural network may include, for example, one or more fully connected layers.

As described above, the fourth model 240 may acquire information on an alignment between a text and speech data. Specifically, the fourth model 240 may acquire information on an alignment between the first speech data 301 and the text data 302 based on the fourth information 305. Alternatively, the fourth model 240 may acquire information on an alignment between the second speech data 401 and a target text based on the information corresponding to the reference numeral 405. In relation to this, the second detailed model may calculate an attention score by receiving the information corresponding to the reference numeral 405 or the fourth information 305 as indicated by reference numeral 501.

According to an example embodiment, an output acquired by inputting, as indicated by reference numeral 502, the information corresponding to the reference numeral 405 or the fourth information 305 to the first neural network may correspond to information on an alignment.

The first neural network may transmit at least one of the fourth information 305 and the information corresponding to the reference numeral 405 to a first detailed model included in the third model 230, so that the fourth model 240 may acquire a corresponding output from the first detailed model as indicated by reference numeral 507. After that, the fourth model 240 may concatenate the output acquired from the first neural network and the output acquired from the first detailed model. For example, the fourth model 240 may acquire sixth information based on fifth information acquired from the first detailed model and the fourth information 305 acquired from the first neural network in the training stage. Alternatively, the fourth model 240 may acquire third information based on the second information acquired from the first detailed model and the information corresponding to the reference numeral 405 acquired from the first neural network in the inference stage.

Specifically, the second detailed model and the first neural network can receive the encoded text and the first information. The second detailed model and the first neural network can generate embedding information (503) based on the encoded text and the first information. The embedding information 503 can comprises components aligned according to the sequence of the text data. The embedding information 503 can comprises the alignment between the text data and the audio data. The embedding information 503 corresponds to the audio data in time domain. The embedding information 503 can comprises the components of the text data aligned based on the alignment between the text data and the audio data. The second detailed model can be a location sensitive attention and the first neural network can be a LSTM layers.

The first detailed model can receive the embedding information 503, the output 506 of the second neural network and the output 505 of the third neural network. The first detailed model can be an attention module. The embedding information 503 may comprise an attention query of attention operation method, the output 506 of the second neural network may comprise an attention key of attention operation method, and the output 505 of the third neural network may comprise an attention value of attention operation method. The first detailed model can generate the second information 507 based on the alignment between the audio data and the speech data. The first detailed model can generate the second information 507 based on the alignment between the embedding information 503 and the speech data.

However, information to be concatenated by the fourth model 240 in the training stage and the inference stage is not limited to the foregoing examples. In some cases, for example, the fourth model 240 may acquire information by concatenating, even in the inference stage, the second information acquired from the first detailed model (in the inference stage) and the fourth information 305 acquired from the first neural network in the training stage. In addition, information to be concatenated by the fourth model 240 may be determined in various ways, such as various combinations of information acquired in the training stage and information acquired in the inference stage.

The fourth neural network may generate an output by receiving the sixth information in the training stage as indicated by reference numeral 508. The fourth model 240 may determine whether the output of the fourth neural network satisfies a preset condition and train the text-to-speech synthesis model 120 based on a result of the determination. In addition, the fourth neural network may generate an output by receiving the information corresponding to the reference numeral 405 in the inference stage as indicated by the reference numeral 508 and acquire audio data based on the generated output.

Depending on examples, whether an output of the fourth neural network satisfies a preset condition in the training stage may be determined by the fourth neural network itself.

According to an example embodiment, the third model 230 may include at least one of the first detailed model and the second neural network. In addition, in some cases, the third model 230 may further include the third neural network (hereinafter, however, an example in which the third neural network is located external to the third model 230 will be described for brevity). The second neural network may include, for example, a plurality of convolutional layers and a plurality of bidirectional long short-term memory (BiL-STM) layers. The third neural network may include, for example, one or more fully connected layers.

The second neural network may receive the first speech data 301 in the training stage or receive the second speech data 401 in the inference stage, acquire a corresponding output, and input the output to the first detailed model as indicated by reference numeral 506. The third neural network may receive the first speech data 301 in the training stage or receive the second speech data 401 in the inference stage, acquire a corresponding output, and input the output to the first detailed model as indicated by reference numeral 505.

The first detailed model may perform an operation based on at least one of the output (corresponding to reference numeral 503) acquired from the first neural network, the output (corresponding to the reference numeral 506) acquired from the second neural network and the output (corresponding to reference numeral 505) acquired from the third neural network. Then, the first detailed model may output a result value thereof as indicated by reference numeral 507. For example, in the training stage, the first detailed model may output the fifth information. Also, in the inference stage, the first detailed model may output the second information.

According to an example embodiment, an operation of acquiring the second information includes a plurality of detailed operations corresponding to a plurality of components included in the target text 402, and a component of the second information may be acquired for each of the plurality of detailed operations. In this case, a j-th detailed operation included in the plurality of detailed operations may correspond to an operation of acquiring a j-th vector included in a plurality of vectors based on a j-th component of information corresponding to the reference numeral 405 including the information on the alignment between the target text 402 and the second speech data 401.

A j-th detailed operation related to the operation of acquiring the fifth information may be an operation of finding and matching the j-th component of the target text 402 and a vector corresponding to embedding information of the second speech data 401 corresponding thereto. In this instance, a degree to which the target text 402 and the embedding information of the second speech data 401 are matched may be indicated by a predetermined index. According to the degree to which the target text 402 and the embedding information of the second speech data 401 are matched, a proportion that each embedding information is reflected may be adjusted. Also, by combining embedding information corresponding to the target text 402, the second information, which includes embedding information having a variable length, may be generated. In terms of a method of combining the embedding information corresponding to the target text 402, various techniques, for example, attention mechanism may be employed.

A j-th detailed operation related to the operation of acquiring the second information may be an operation of finding and matching the j-th component of the text data 302 and a vector corresponding to embedding information of the first speech data 301 corresponding thereto. In this instance, a degree to which the text data 302 and the embedding information of the first speech data 301 are matched may be indicated by a predetermined index. Based on the degree, a proportion that each embedding information is reflected may be adjusted. By combining embedding information corresponding to the text data 302, the fifth information, which includes embedding information having a variable length, may be generated. In terms of a method of combining the embedding information corresponding to the text data 302, various techniques, for example, attention mechanism may be employed.

Specifically, in relation to the acquirement of the second information or the fifth information, the j-th detailed operation may correspond to an operation of acquiring the j-th vector based on Equation 1. In the training stage, $e_v^j$ may correspond to the j-th component of the fifth information, K may correspond to an output of the second neural network receiving the first speech data 301, V may correspond to an output of the third neural network receiving the first speech data 301, and $Q^j$ may correspond to the j-th component of the fourth information 305. Specifically, $Q^j$ may correspond to a result obtained by inputting, to the first neural network, a result of extracting the j-th component according to a sequence of the text data 302 generated based on the alignment between the encoded text data 302 and the embedding information 303 corresponding to the first speech data 301 having a predetermined length. In the inference stage, $e_v^j$ may correspond to the j-th component of the second information, K may correspond to an output of the second neural network receiving the second speech data 401, V may correspond to an output of the third neural network receiving the second speech data 401, and $Q^j$ may correspond to the j-th component of the information corresponding to the reference numeral 405. Specifically, $Q^j$ may correspond to a result obtained by inputting, to the first neural network, a result of extracting the j-th component according to the sequence of the target text 402 generated based on the alignment between the encoded target text and the first information 403.

$$e_v^j = \text{softmax}\left(\frac{f(Q^j)f(K)^T}{\sqrt{d_m}}\right)f(V) \quad \text{[Equation 1]}$$

$d_m$ may correspond to a dimension of Q, f may correspond to a flattening function, and softmax may correspond to a softmax function.

According to an embodiment, K may comprise an attention key of attention mechanism, V may comprise an attention value generated by one or more fully connected layers, and Q may comprise an attention query.

The fifth information and the second information calculated based on Equation 1 may have different values for each component and correspond to a variable-length embedding having a variable length value. For example, because the second information is a set of results obtained by extracting speech embedding corresponding to each component of the target text 402, a length of the second information may be variably determined based on a length of the target text 402.

As such, the variable-length embedding includes vectors corresponding to components according to a time sequence of the target text 402 or the text data 302 and thus, may maintain temporal information without change. That is, the second information and the fifth information may include information on relationships between temporally subsequent components after a corresponding component and a characteristic in units of each component (for example, a syllable). However, in the training stage and the inference stage, information received by the first detailed model to perform an operation is not limited to the foregoing examples. For example, in the above-described example, the first detailed model receives the information corresponding to the reference numeral 405, which is an output of the first neural network, and acquires the second information in the inference stage. However, the first detailed model may also acquire the second information by receiving the fourth information 305, which is an output of the first neural network in the training stage. In this case, even in the inference stage, $Q^j$ may correspond to the information corresponding to the reference numeral 405. In addition, information to be received by the first detailed model to perform an operation may be determined in various ways, for example, by diversely combining information acquired in the training stage and information acquired in the inference stage.

Figure 6:
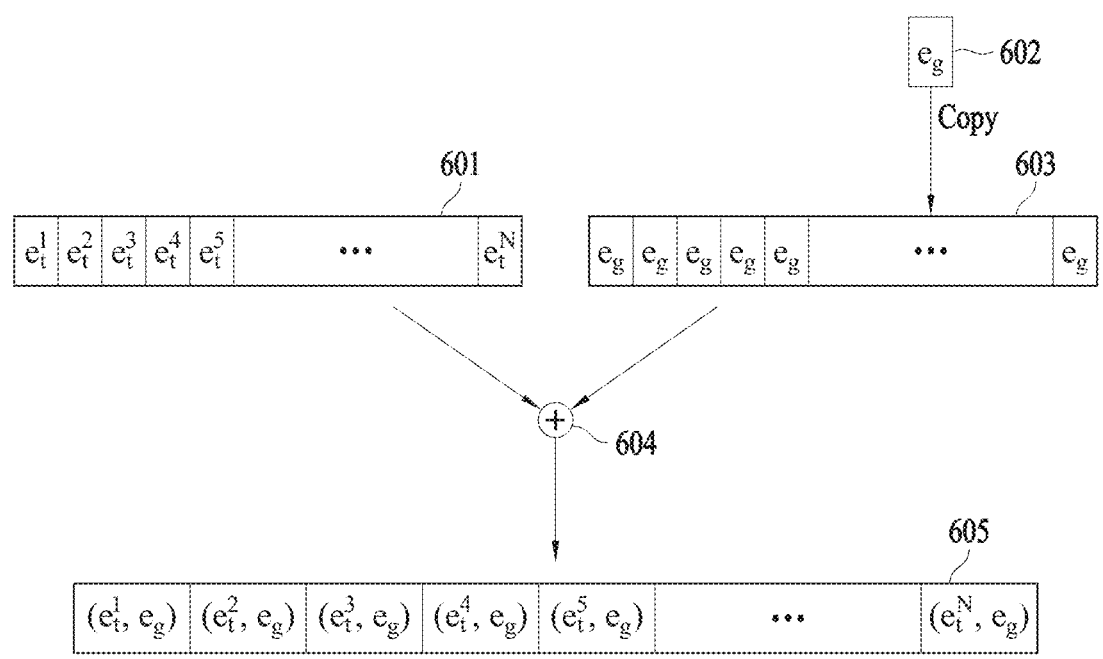
FIG. 6 is an exemplary diagram illustrating an operation of concatenating embedding information and text data to train a text-to-speech synthesis model according to an example embodiment.

FIG. 6 is an exemplary diagram illustrating an operation of concatenating embedding information and text data to train a text-to-speech synthesis model according to an example embodiment. An operation described with reference to FIG. 6 may be the operation of FIG. 3 performed to acquire information corresponding to the fourth information 305.

Referring to FIG. 6, according to an example embodiment, information 605 generated through a concatenation may be acquired by directly concatenating the text data 302 with embedding information 602 corresponding to the first speech data 301 and having a predetermined length independent of the length of the first speech data, and may also be acquired by concatenating processed information of the text data 302 with embedding information 602. Reference numeral 601 may correspond to the text data 302 to be concatenated with the embedding information 602, or information obtained by processing the text data 302.

When the text data 302 includes N (or a plurality of) messages, the text-to-speech synthesis model 120 may copy the embedding information 602 based on a number corresponding to a number of the plurality of messages, thereby acquiring copied embedding information 603. After that, the text-to-speech synthesis model 120 may acquire information corresponding to the information 605 by concatenating the copied embedding information 603 with the plurality of messages or for each component of an output of the first model 210 corresponding to each of the plurality of messages as indicated by reference numeral 604.

Alternatively, when the text data 302 includes a plurality of components obtained by classifying one or more messages according to a sequence, the text-to-speech synthesis model 120 may copy the embedding information based on a number corresponding to the plurality of components, thereby acquiring the copied embedding information 603. After that, the text-to-speech synthesis model 120 may acquire the information 605 by concatenating the copied embedding information 603 for each component of the output of the first model 210 corresponding to each of the plurality of components as indicated by the reference numeral 604.

Figure 7:
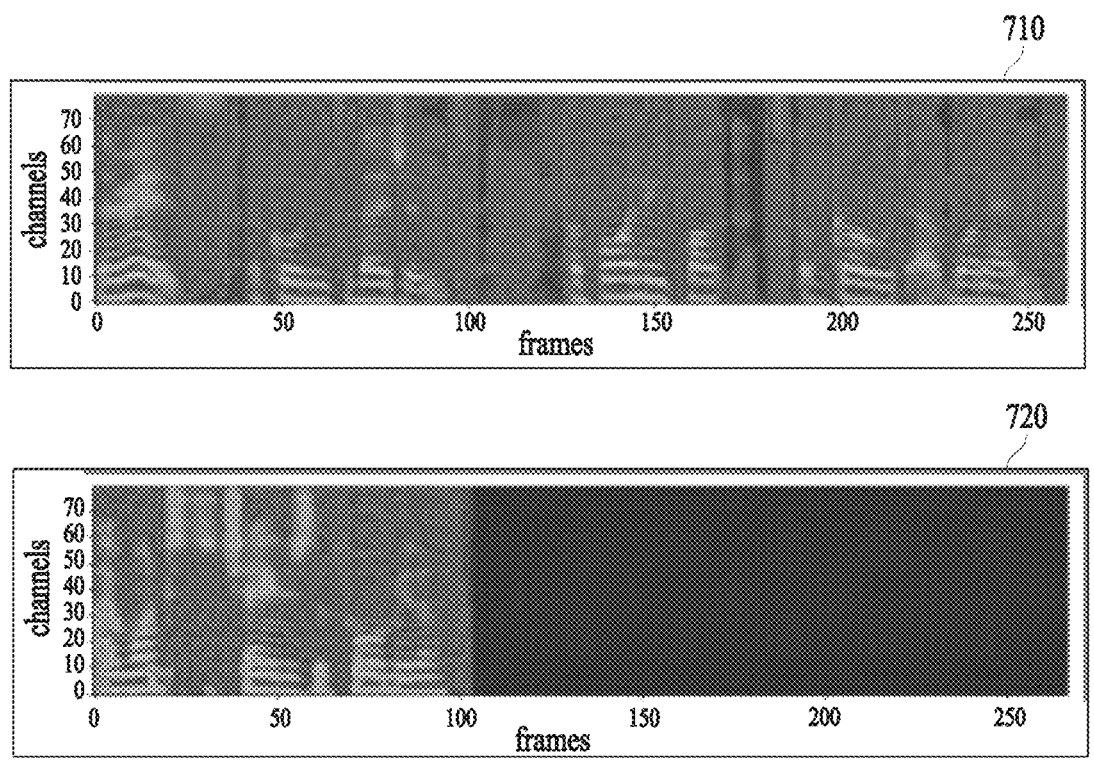
FIG. 7 is an exemplary diagram illustrating a case in which at least one of first speech data, second speech data, and audio data corresponds to an image represented as a graph by visualizing sound spectrum according to an example embodiment.

FIG. 7 is an exemplary diagram illustrating a case in which at least one of first speech data, second speech data, and audio data corresponds to an image represented as a graph by visualizing sound spectrum (e.g., a spectrogram) according to an example embodiment.

Referring to FIG. 7, according to an example embodiment, at least one of the first speech data 301, the second speech data 401, and the audio data may correspond to a spectrogram which is an image represented as a graph by visualizing sound spectrum. Reference numerals 710 and 720 may be examples of spectrograms represented as graphs by visualizing sound spectrum based on a frame as an x axis and a channel as a y axis.

The reference numeral 720 may correspond to a spectrogram visualized by removing at least a portion of sound corresponding to the reference numeral 710. For example, the reference numeral 710 may be a spectrogram corresponding to speech data obtained by uttering "annyeonghaseyo." In this example, the reference numeral 720 may be a spectrogram corresponding to a graph of a portion "annyeong" remaining after a graph of a portion "haseyo" is removed from "annyeonghaseyo" of the reference numeral 710.

According to an example embodiment, in a training stage, only a portion corresponding to the text data 302 of the first speech data 301 may be input to the second model 220 while the first speech data 301 is input to the first model 210 without change. For example, the first speech data may include the spectrogram corresponding to the speech data obtained by uttering "annyeonghaseyo" and the text data 302 may include "annyeong." In this example, the spectrogram corresponding to the speech data obtained by uttering "annyeonghaseyo" may be input to the third model 230 without change (corresponding to the reference numeral 710). Also, to the second model 220, the spectrogram corresponding to the graph of the portion "annyeong" remaining after the graph of the portion "haseyo" is removed from "annyeonghaseyo" may be input (corresponding to the reference numeral 720).

Figure 8:
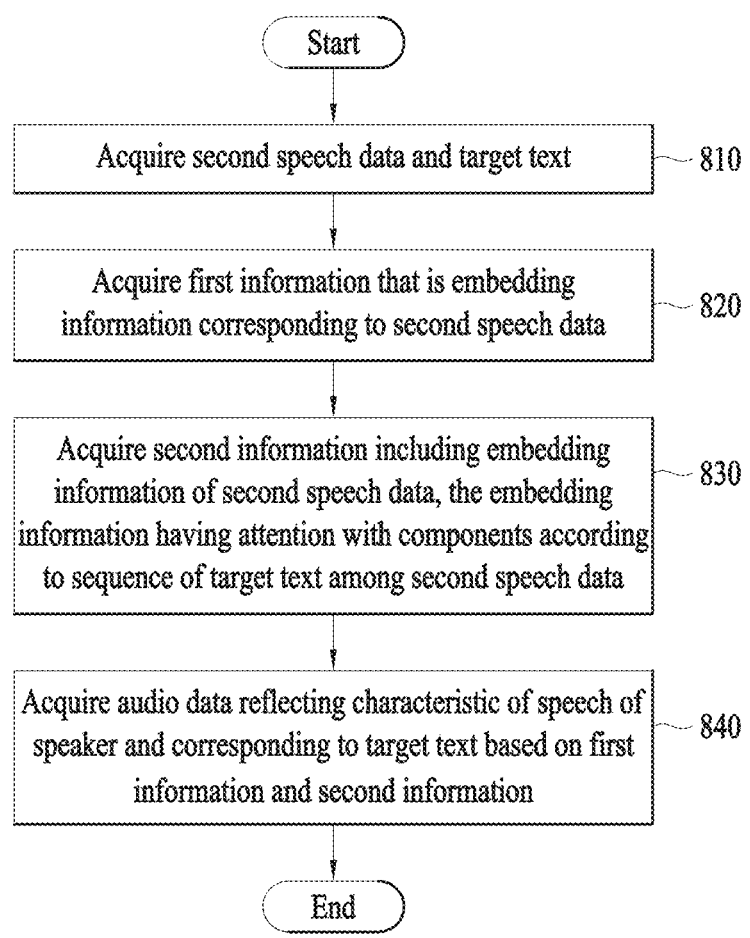
FIG. 8 is a flowchart illustrating a speech synthesis method using a text-to-speech synthesis model according to an example embodiment.

FIG. 8 is a flowchart illustrating a speech synthesis method using a text-to-speech synthesis model according to an example embodiment.

Referring to FIG. 8, the speech synthesis apparatus 110 according to an example embodiment synthesizes speeches using the text-to-speech synthesis model 120 trained based on the first speech data 301 and the text data 302 corresponding to at least a portion of the first speech data 301.

The speech synthesis apparatus 110 acquires the second speech data 401 and the target text 402 in operation 810, acquires the first information 403 that includes embedding information corresponding to the second speech data 401 in operation 820, and acquires the second information including embedding information of the second speech data 401, the embedding information in relation with components generated based on a sequence of the target text 402 among the second speech data 401 in operation 830.

In operation 840, the speech synthesis apparatus 110 acquires audio data reflecting characteristics of speech of a speaker and corresponding to the target text 402 based on the acquired first information 403 and second information.

Figure 9:
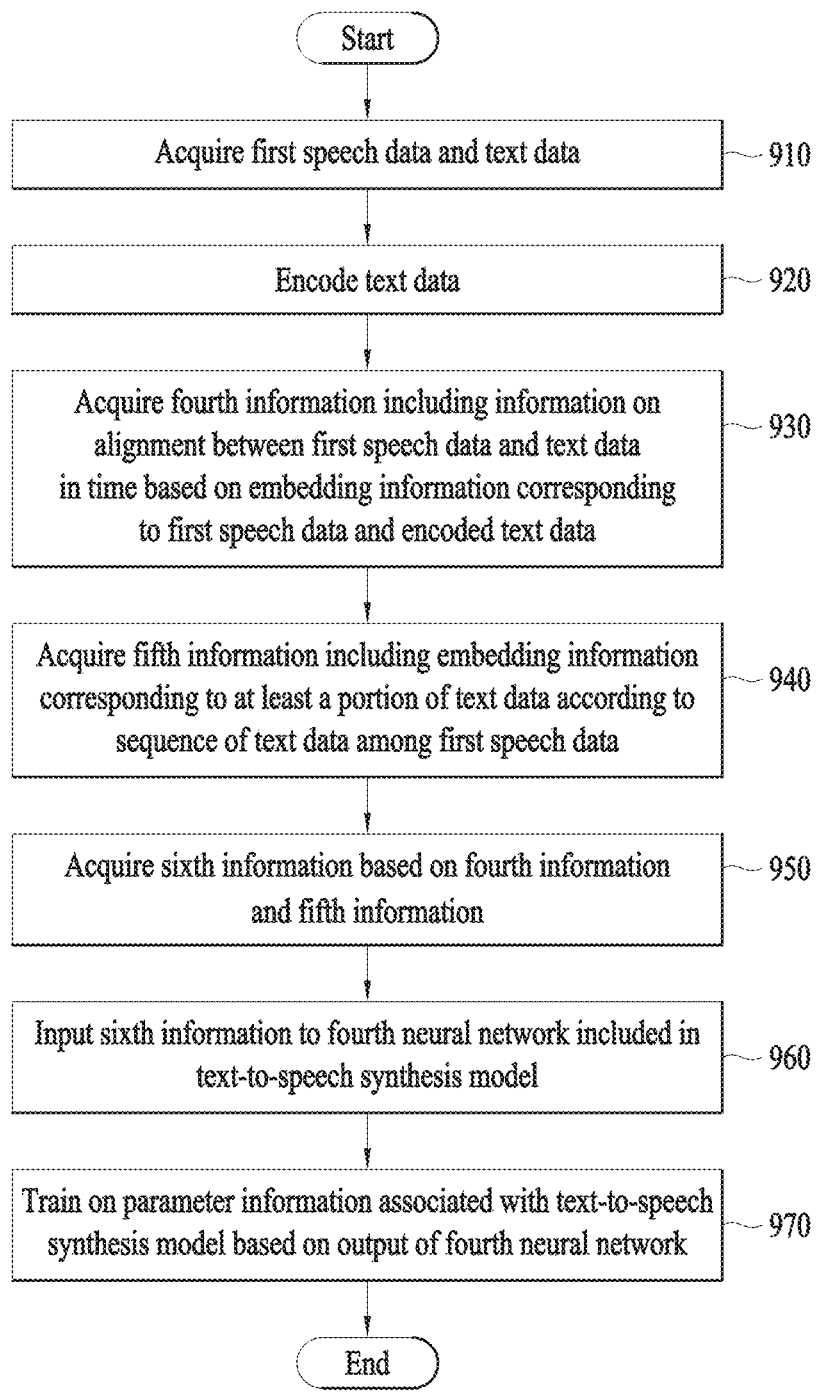
FIG. 9 is a flowchart illustrating a method of training a text-to-speech synthesis model according to an example embodiment.

FIG. 9 is a flowchart illustrating a method of training a text-to-speech synthesis model according to an example embodiment.

Referring to FIG. 9, the speech synthesis apparatus 110 according to an example embodiment acquires the first speech data 301 and the text data 302 in operation 910 and encodes the text data 302 in operation 920. In operation 930, the speech synthesis apparatus 110 acquires the fourth information 305 including information on an alignment between the first speech data 301 and the text data 302 in time based on embedding information corresponding to the first speech data 301 and the encoded text data.

The speech synthesis apparatus 110 acquires fifth information including embedding information of the first speech data 301, the embedding information in relation with components generated based on a sequence of the text data in operation 940, acquires sixth information based on the fourth information and the fifth information in operation 950, and inputs the sixth information to a fourth neural network included in the text-to-speech synthesis model 120 in operation 960. In operation 970, the speech synthesis apparatus 110 trains on parameter information associated with the text-to-speech synthesis model 120 based on an output of the fourth neural network.

Figure 10:
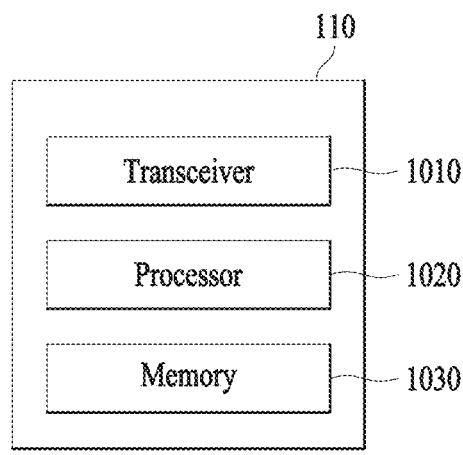
FIG. 10 is an exemplary diagram illustrating a configuration of a speech synthesis apparatus according to an example embodiment.

FIG. 10 is a diagram illustrating an example of a speech synthesis apparatus according to an example embodiment.

Referring to FIG. 10, the speech synthesis apparatus 110 includes a transceiver 1010, a processor 1020, and a memory 1030. The speech synthesis apparatus 110 is connected to the text-to-speech synthesis model and other external devices through the transceiver 1010, and may perform data exchange.

The processor 1020 may include at least one of the devices described above with reference to FIGS. 1 through 9, or may perform at least one method described above with reference to FIGS. 1 through 9. The memory 1030 may store information for performing at least one method described above with reference to FIGS. 1 through 9. The memory 1030 may be a volatile memory or a nonvolatile memory.

The processor 1020 may execute a program and control the speech synthesis apparatus 110 for providing information. The code of a program executed by the processor 1020 may be stored in the memory 1030.

Also, in an example embodiment, the speech synthesis apparatus 110 may include a user interface (UI) for providing information to a user and receive an input from the user based on the UI.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A speech synthesis method, the speech synthesis method comprising:
    acquiring a second set of speech data and a target text;
    acquiring, using a text-to-speech synthesis model trained based on text data corresponding to a first set of speech data and at least a portion of the first set of speech data, a first set of information, wherein the first set of information includes a first set of embedding information comprising the second set of speech data;
    acquiring, using the text-to-speech synthesis model, a second set of information, wherein:
        the second set of information includes a second set of embedding information, comprising embeddings of the second set of speech data,
        the second set of embedding information is acquired by deploying an attention mechanism using query components generated based on a sequence of the target text, and
        acquiring the second set of information comprises:
            encoding the target text, and
            extracting the query components from the encoded target text. wherein:
                the query components are generated based on a sequence of the encoded target text, and
                the sequence is generated based on the first set of information and the encoded target text;
    acquiring audio data, using the text-to-speech synthesis model, wherein the audio data:
        corresponds to the target text, and
        reflects characteristics of speech of a speaker of the second set of speech data, as a sound spectrum visualization generated based on the first set of information and the second set of information; and
    deriving, using the text-to-speech synthesis model, a speech recording corresponding to the audio data.

2. The speech synthesis method of claim 1, wherein:
    the first set of embedding information includes a vector that:
        corresponds to the second set of speech data, and
        has a predetermined length independent of a length of the second set of speech data; and
    the second set of embedding information includes a plurality of vectors, with variable lengths.

3. The speech synthesis method of claim 2, wherein lengths of the plurality of vectors are variably determined based on a length of the target text.

4. The speech synthesis method of claim 1, wherein the extracting of the query components comprises:
    inputting the encoded target text into a first model, wherein the first model is included in the text-to-speech synthesis model; and
    concatenating an output of the first model with the first set of information, wherein the output of the first model includes a plurality of preliminary components generated based on the sequence.

5. The speech synthesis method of claim 4, wherein the concatenating of the output of the first model with the first set of information comprises:
    copying the first set of information based on a number of the plurality of preliminary components included in the output of the first model; and
    concatenating the copied first set of information with the plurality of preliminary components.

6. The speech synthesis method of claim 1, wherein the acquiring of the second set of information further comprises inputting a result, obtained by extracting the query components generated based on the sequence of the encoded target text, into a first neural network included in the text-to-speech synthesis model.

7. The speech synthesis method of claim 1, wherein the acquiring of the second set of information further comprises:
    inputting the second set of speech data to a second neural network included in the text-to-speech synthesis model;
    inputting the second set of speech data to a third neural network included in the text-to-speech synthesis model; and
    acquiring the second set of information based on an output of the second neural network, an output of the third neural network, and the query components generated based on the sequence of the encoded target text.

8. The speech synthesis method of claim 1, wherein:
    the acquiring of the second set of information further comprises a plurality of detailed operations, and
    a j-th detailed operation included in the plurality of detailed operations corresponds to acquiring a j-th component of the second set of information based on the encoded target text and the first set of information.

9. The speech synthesis method of claim 8, wherein the j-th detailed operation corresponds to acquiring the j-th component of the second set of information based on Equation 1, wherein Equation 1 follows form:

$$e_v^j = \text{softmax}\left(\frac{f(Q^j)f(K)^T}{\sqrt{d_m}}\right)f(V),$$

wherein:
    $e_v^j$ is the j-th component of the second set of information,
    $Q^j$ is a result of inputting a result obtained by extracting a j-th query component of the query components generated based on the sequence of the encoded target text, into a first neural network included in the text-to-speech synthesis model,
    K is an output of a second neural network included in the text-to-speech synthesis model when the second set of speech data is input into the second neural network,
    V is an output of a third neural network included in the text-to-speech synthesis model when the second set of speech data is input into the third neural network,
    $d_m$ is a dimension of the query components generated based on the sequence of the encoded target text,
    f is a flattening function, and
    softmax is a softmax function.

10. The speech synthesis method of claim 1, wherein the acquiring of the audio data comprises:
    acquiring a third set of information based on a result obtained by inputting the second set of information and the query components according to the sequence of the second set of speech data to a first neural network included in the text-to-speech synthesis model;
    inputting the third set of information into a fourth neural network included in the text-to-speech synthesis model; and
    acquiring audio data corresponding to the third set of information based on an output of the fourth neural network.

11. The speech synthesis method of claim 1, wherein:
the text-to-speech synthesis model comprises:
a first model configured to:
receive text information including at least one of the target text or the text data,
encode the text information, and
output a result of the encoding;
a second model configured to:
receive at least one of the first set of speech data or the second set of speech data, and
output a third set of embedding information, comprising the speech data received by the second model;
a third model configured to:
receive at least one of the first set of speech data or the second set of speech data, and
output a fourth set of embedding information comprising embeddings of the speech data received by the third model, wherein the fourth set of embedding information is acquired by deploying the attention mechanism using the query components generated based on the sequence of the text information; and
a fourth model configured to:
acquire alignment information on an alignment between the text information and the speech data received by the second model by receiving the output of the first model and the output of the second model, and
output a result of inputting, into a neural network:
the fourth set of embedding information, and
the alignment information on the alignment, and
the result output from the fourth model is input to the third model so that the third model is configured to run in association with the fourth model.

12. The speech synthesis method of claim 1, wherein the text-to-speech synthesis model may be trained by:
acquiring the first set of speech data and the text data;
encoding the text data;
acquiring a fourth set of information including alignment information on an alignment in time between the first set of speech data and the text data, wherein the alignment is based on a third set of embedding information, comprising the first set of speech data, and the encoded text data;
acquiring a fifth set of information including a sixth set of embedding information, wherein the sixth set of embedding information comprises embeddings of the first set of speech data and is acquired by deploying the attention mechanism using query components generated based on the sequence of the text data;
acquiring a sixth set of information based on the fourth set of information and the fifth set of information;
inputting the sixth set of information into a fourth neural network included in the text-to-speech synthesis model; and
training the text-to-speech synthesis model on parameter information based on an output of the fourth neural network.

13. The speech synthesis method of claim 12, wherein:
the parameter information includes at least one piece of weight information and at least one piece of bias information associated with the text-to-speech synthesis model,
the at least one piece of weight information includes weight information associated with at least a portion of each of a first model, a second model, a third model, and a fourth model included in the text-to-speech synthesis model,
the at least one piece of bias information includes bias information associated with at least a portion of each of the first model, the second model, the third model, and the fourth model, and
at least a portion of each of the at least one piece of weight information and the at least one piece of bias information is associated with a second neural network, wherein the second neural network is associated with the at least a portion of each of the first model, the second model, the third model, and the fourth model.

14. The speech synthesis method of claim 12, wherein the training on the parameter information is based on an output of the fourth neural network such that a correlation between the first set of speech data and the text data is learned.

15. A non-transitory computer-readable recording medium comprising a computer program for performing a speech synthesis method, the speech synthesis method comprising:
acquiring a second set of speech data and a target text;
acquiring, using a text-to-speech synthesis model trained based on text data corresponding to a first set of speech data and at least a portion of the first set of speech data, a first set of information, wherein the first set of information includes a first set of embedding information comprising the second set of speech data;
acquiring, using the text-to-speech synthesis model, a second set of information, wherein:
the second set of information includes a second set of embedding information, comprising embeddings of the second set of speech data,
the second set of embedding information is acquired by deploying an attention mechanism using query components generated based on a sequence of the target text, and
acquiring the second set of information comprises:
encoding the target text, and
extracting the query components from the encoded target text, wherein:
the query components are generated based on a sequence of the encoded target text, and
the sequence is generated based on the first set of information and the encoded target text;
acquiring audio data, using the text-to-speech synthesis model, wherein the audio data:
corresponds to the target text, and
reflects characteristics of speech of a speaker of the second set of speech data as a sound spectrum visualization generated based on the first set of information and the second set of information; and
deriving, using the text-to-speech synthesis model, a speech recording corresponding to the audio data.

16. The speech synthesis method of claim 9, wherein:
the query components generated based on the sequence of the encoded target text make up an attention query,
K is an attention key, and
V is an attention value.

* * * * *